've# 2,987,412
PROCESS FOR THE PREPARATION OF ORGANOPHILIC OXIDES AND CHROMATE PIGMENTS

Lajos Csonka, 14 Pazsit utca, Budapest II, Hungary; Ferenc Horkay, 4 Kapitany utca, Budapest XII, Hungary; Ferenc Szanto, 6 Corvin utca, Budapest IV, Hungary; and Janos Szerecz, 8 Guyon R. Koz, and Jeno Gonczy, 34 Csalan utca, both of Budapest II, Hungary No Drawing. Filed June 5, 1959, Ser. No. 818,253
Claims priority, application Hungary Jan. 15, 1959
4 Claims. (Cl. 106—302)

It is usual to treat lithopone pigments with water-soluble soaps in order to improve their mixing and dispersing properties. Lithopone, which is known to be a mixture of zinc sulfide and barium sulfate, can be thus made organophilic to a satisfactory extent. The same process is, however, not suitable for oxide pigments, since on the effect of the soap solution they will form a highly dispersed suspension. Oxide pigments do not precipitate and thus cannot be processed for industrial use. Chromate pigments change their color upon the effect of the soap, whereby their quality is deteriorated.

We have found the above drawbacks to be removed by treating the pigment substance with an anion-active agent having a non-polar radical, and subsequently acidifying the solution, preferably to pH=5. Thereupon the oxide pigments become readily filterable, and readily removable from the liquid. After washing, if necessary, they are dried and perhaps disintegrated. After acidifying chromate pigments recover their original color so that excellent quality organophilic and readily filterable pigments are obtained. The organophilic pigments thus obtained are highly dispersible in organic solvents and can be readily processed to stable suspensions.

For acidifying the aqueous medium preferably mineral acids are used, such as hydrochloric acid, sulphuric acid, phosphoric acid, and strong organic acids, such as acetic acid. For modifying the surface of the pigments the water soluble salts, like the alkali or preferably ammonium salts of fatty acids, in particular fatty acids with 16 to 18 carbon atoms are employed. The alkali salt or ammonium salt of ricinoleic acid can also be used to advantage. Furthermore, the same salts of industrial stearine, consisting of a mixture of stearic, palmitic, and oleic acids, can also be employed.

For rendering the pigments organophilic, organic compounds having a high water solubility and good electrolytical dissociation properties can be used, which in aqueous solutions yield anions of asymmetrical polar structure. Compounds of this type are alkali- or ammonium salts of saturated or non-saturated monobasic fatty acids having at least 8 carbon atoms, alkali or ammonium salts of partially polymerized non-saturated fatty acids, further alkali salts of alkyl-, aryl-, or mixed alkyl-aryl-sulfonic acids.

The pigments used in the process according to the invention are oxide or oxide-hydroxide pigments precipitated or prepared by pyrogenic processes, such as titanium dioxide, iron oxide red and yellow, chrome oxide green, bauxite of high iron oxide content, aluminium oxide and the like, and also chromate pigments, such as zinc chromate, zinc tetroxy chromate, lead chromate, basic lead chromate and the like. These pigments have positive surface charges in aqueous solutions and are capable of ion exchange when reacted with anion-active agents. The anion-active non-polar ions adsorbed on the surface of the pigment particles become irreversibly bound to the surface upon subsequent acidification, and drying following upon filtering. Thus, an organophilic film fixed on the surface of the said pigment particles is produced, whereby the dry pigment particles exhibit an organophilic character.

In the case of chromate pigments the optimum amount of the substance rendering them organophilic can be established by experimental trials. It has been found that the amount depends on the kind and dispersity of the pigment applied. It is advisable to effect the trials in the following manner: A series of equal pigment amounts is suspended in equal amounts of water, then equal volumes of aqueous solutions are added containing increasing amounts of the agents which render the pigment organophilic. The suspensions are thoroughly agitated, and after a certain time the volume of the sediment is ascertained. The largest amount of sediment, that is, the amount of the organophilic agent associated thereto will indicate the optimum amount. The pigments treated with the amount so established will exhibit the best organophilic properties and will unite most readily and with the highest dispersion with the organic substance of the paint vehicles where they form non-settling stable suspensions.

The step of rendering the pigment substances organophilic can be most conveniently effected as follows: About 10 to 50% pigment is suspended in water, and a 1 to 4% aqueous solution of the organophilic agent, which is heated preferably to 70 to 80° C., is added thereto at an elevated temperature, preferably at 70 to 80° C. From 0.5 to 5% of the organophilic agent, depending on the experimental trial, based on the pigment weight, is used. The pigment suspension so prepared is then acidified to pH 5, then the pigments are readily separated from the water, washed, dried preferably at 60 to 100° C. and disintegrated.

Example 1

500 g. titanium dioxide are suspended in 2 l. of distilled water, and 1 liter 1% ammonium stearate is added while stirring. Stirring is carried on, and diluted hydrochloric acid is used for adjusting the pH to 5. The pigment suspension thereupon forms a readily filterable precipitate, which is filtered off, washed if necessary with water, dried at 80 to 100° C., then granulated in an edge runner. The pigment so obtained is once milled in a three-roller mill and is used for preparing an enamel paint which is still entirely free from sediments after one year. Subjected to a weather exposure test, it showed a life thrice as long as an enamel paint containing non-organophilic pigments. It has better spreading properties and a higher gloss and the films obtained therefrom are highly waterproof and the pigment particles will not migrate to the surface.

Organophilic pigments can be produced in the same manner from iron oxide yellow and iron oxide red, chrome oxide green, aluminium oxide and bauxite of high iron oxide content.

Example 2

Experimental trials showed that the best addition to a lead chromate pigment in an aqueous suspension is 1% by weight of ammonium stearate, as the latter produced the largest sediment volume. 500 g. lead chromate are suspended in 2 l. water, then 500 g. 1% ammonium stearate are added at 65 to 70° C. under brisk agitation. Thereupon the light yellow pigment turns orange. The pH of the pigment suspension is adjusted with hydrochloric acid to 5, whereupon the chrome yellow regains its original colour. The precipitate is filtered, washed with water, dried at 60 to 100° C. and homogenised in an edge runner. The ammonium salts of fatty acids have the advantage over sodium soaps that upon acidification the original colour shade can more perfectly be reestablished. The $NH_4Cl$ which is formed can be driven off in the course of drying.

Organophilic pigments can be prepared likewise from zinc chromate, zinc tetrahydroxy chromate, barium chromate, or strontium chromate.

*Example 3*

The organophilic pigment obtained in accordance with Example 1 or 2 can be readily employed in non-polar or slightly polar organic media and lacquer base materials, like oil lacquers, epoxy esters, alkyd resins. Organophilic pigments of good wetting properties, that is, apt to be suspended in polar organic media, such as alcohols, ketones, esters, and in lacquer base materials, such as nitrocellulose, alcohol lacquers, in a mixture of aminoplast and alkyd resin, and aminoplast-epoxide resin mixture, phenolplast-epoxide resin mixture, can be obtained with the process described in the preceding examples, but using, instead of ammonium stearate, the equivalent amount of a hydrophilic agent carrying on the non-polar radical an OH-group, such as ammonium ricinoleate.

We claim:

1. A process for rendering inorganic pigments, selected from the group consisting of oxides, oxyhydroxides and chromates, organophilic in which an aqueous suspension of the pigment is reacted with a solution of a salt selected from the group consisting of alkali salts and an ammonium salt of a fatty acid selected from the group consisting of fatty acids having 16 to 18 carbon atoms and fatty acids containing an OH-group, the alkali salt and the ammonium salt of the fatty acid being used in a quantity of 0.5 to 5% based on the pigment weight, then the solution is acidified to pH 5 with an acid selected from the group consisting of hydrochloric acid, sulfuric acid, phosphoric acid, formic acid and acetic acid, whereupon the pigment is separated from the liquid, dried, and disintegrated.

2. A process according to claim 1, in which the ammonium salt of ricinoleic acid is used for rendering the pigments organophilic.

3. A process according to claim 1, in which a water-soluble salt of industrial stearine, containing stearic acid, palmitic acid and oleic acid, is used for making the pigments organophilic.

4. A process according to claim 1, in which a water-soluble salt of a partly polymerized unsaturated fatty acid is used for making the pigments organophilic.

References Cited in the file of this patent

UNITED STATES PATENTS

| | | |
|---|---|---|
| 1,919,714 | Endres | July 25, 1933 |
| 2,036,570 | Depew | Apr. 7, 1936 |
| 2,065,687 | Gearhart et al. | Dec. 29, 1936 |
| 2,068,066 | O'Brien | Jan. 19, 1937 |
| 2,267,240 | Kummel | Dec. 23, 1941 |